Patented Nov. 18, 1941

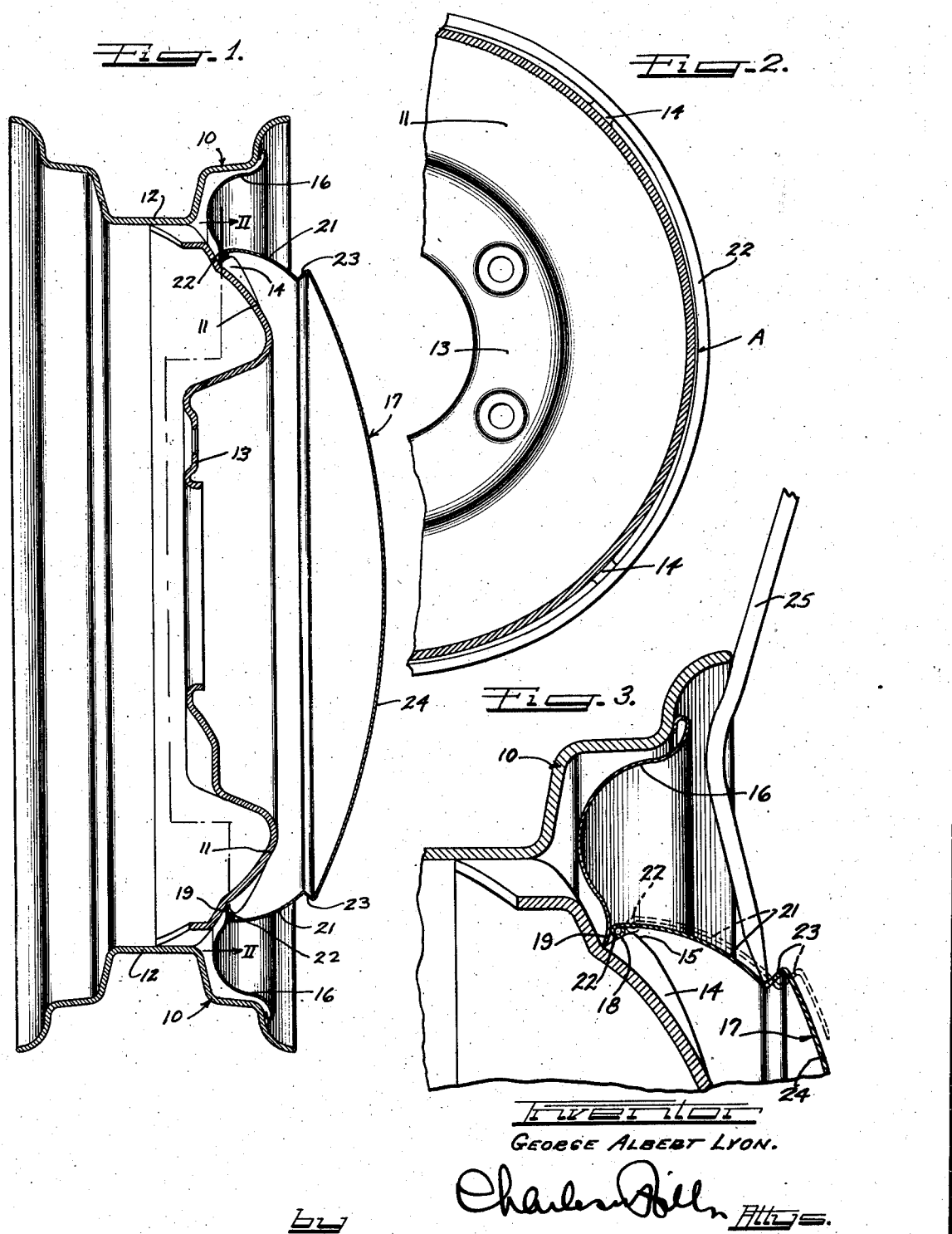

2,263,243

UNITED STATES PATENT OFFICE 2,263,243

WHEEL CONSTRUCTION

George Albert Lyon, Allenhurst, N. J.

Application November 24, 1939, Serial No. 305,856

3 Claims. (Cl. 301—37)

This invention relates to an automobile wheel construction, and more particularly to a snap-on wheel cover and trim members.

An object of this invention is to provide an improved and simplified construction for retaining a cover or trim member on the body part of an automobile wheel.

Another object of this invention is to provide a wheel disk or closure of relatively light weight and so adapted to cooperate with the wheel that the unsprung weight of the wheel may be materially reduced.

A still further object of the invention relates to the provision of a wheel cover member which may be retained on the wheel by reason of the inherent resiliency or tension of the cover member itself and so as to eliminate the need for the use of any retaining spring elements on the wheel body.

Still another object of the invention relates to the provision of a hub cap having a resilient peripheral edge portion for cooperation with retaining means on a wheel and provided with stiffening means radially inward of the edge to serve as a rigid backing about which the edge portion is adapted to flex.

In accordance with the general features of this invention, there is provided a wheel covering member having a turned outer peripheral edge portion adapted to be flexibly snapped over retaining protuberances on a wheel, the marginal portion of the member adjacent said edge portion being provided with stiffening means in the form of a rib to serve as a backing about which the edge portion is adapted to flex as it is applied to the wheel.

Another feature of the invention relates to the position of a stiffening means in a wheel cover member adjacent a tire rim, so that this stiffening means may serve as a point or place for the application of a pry-off force to remove the cover member from the wheel.

Another feature of the invention relates to the provision on a part of a wheel of a plurality of spaced rigid protuberances disposed in a common circle each having an outwardly facing edge portion disposed adjacent the junction of the wheel body and rim parts so as to retainingly cooperate with both a trim ring disposed on the rim part and a hub cap or disk disposed on the body part.

Another and further feature of the invention relates to the provision of a single one-piece metal closure member or disk having an axially inwardly turned continuous flexible outer edge for telescoping cooperation with retaining protuberances on a wheel; the closure member also being provided with a stiffening rib radially inward of said edge and so arranged that a portion of the member including the edge may flex radially relative to said stiffening rib without disturbing or buckling the outer face of the member beyond said stiffening rib.

Other objects and features of this invention will more fully appear from the following detailed description taken in connection with the accompanying drawing which illustrate a single embodiment thereof, and in which:

Figure 1 is a vertical cross sectional view through a wheel construction embodying the features of this invention;

Figure 2 is a fragmentary sectional view of a portion of the wheel structure taken on line II—II of Figure 1, looking in the direction of the arrows, and showing how the flexible edge on the closure member is distorted or flexed when it is in retaining cooperation with the rigid protuberances on the wheel body; and Figure 3 is an enlarged fragmentary cross sectional view corresponding to the upper portion of Figure 1 and illustrating how the flexible edge on the closure disk or member is flexed in its application to the wheel, and also showing how a pry-off tool may be used in conjunction with the stiffening rib on the closure member to enable its removal from the wheel.

As shown on the drawing:

The reference character 10 designates generally a drop center type of tire rim, and the reference character 11 designates generally the body part of the wheel which is suitably secured to the base flange 12 of the tire rim. The central portion 13 of the wheel body part is provided with the usual wheel bolt apertures for enabling the wheel to be secured to a central support either in conjunction with a wheel axle or a separate support for the wheel.

Adjacent the junction of the tire rim and wheel body parts, the body part is provided with a plurality of spaced protuberances 14 which are arranged in a common circle. These protuberances are rigid and may be either formed out of the same metal as the body part or may constitute separate pieces of metal suitably secured as by welding, riveting, or the like to the body part.

The tire rim 10 and body part 11 constitute the principal parts of the wheel and may be fabricated from suitable metallic material by the usual manufacturing processes.

Each of the protuberances 14 has a hump portion 15 over which may slide the edges of two decorative parts such as the trim ring 16 and the cover member 17. It will also be noted that each of these protuberances has a radially outwardly facing surface 18 over which the aforesaid edges of the cooperative ornamental parts are adapted to ride or slide in the application of these members to the wheel.

The trim member or ring 16 constitutes a complete annulus and is preferably made of metal having a highly finished exterior surface. This ring 16 has a tortuous cross sectional shape so as to conform roughly with the outer contour of the outer side flanges of the tire rim 10 and has an inner continuous flexible edge 19 which is adapted to be resiliently flexed or forced over the humps 15 of the protuberances 14 into the retained position shown in Figure 1.

Positioned radially inward of the trim ring 16 is the wheel cover member or hub cap 17, which comprises a single disk of metal suitably formed on a press in the desired shape. This metallic disk is of dished configuration and has a highly finished outer exterior surface so as to enhance the appearance of the wheel. If it is so desired, a suitable emblem or other ornamental device may be secured to the center of the wheel in the usual way. For example, the name of the automobile to which this ornamental member is applied may constitute the embellishment on the central portion of the disk member, as is well known to those familiar with this art.

The dished member 17 has an axially inwardly extending marginal portion 21 terminating in a rolled or turned edge 22, which is continuous and flexible. This edge has a slightly less diameter than that of the outer faces 18 of the protuberances so as to require flexing of the edge to get it over the protuberances. This marginal portion 21 is confined between the turned edge 22 and a stiffening or rigidifying hump or rib 23 formed at the outer margin of the crown or face portion 24 of the cover member 17. As a consequence, there is provided between the stiffening rib 23 and the outer edge 22 of the cover member 17 a radially flexible flange portion 21 which is flexible between the limits defined by the edge 22 and the rib 23. That is to say, in the flexing of the edge 22 as the closure member is applied to the wheel, the stiffening rib 23 serves as a backing against which the portion 21 flexes in a leverlike manner. This flexing occurs without in any way buckling or distorting the central crown or face portion 24 of the wheel cover member.

In Figure 1, I have illustrated the position of the closure member 17 when it is in retaining cooperation with the protuberances 14 on the wheel. When in this position, it will be perceived that the outer edge 22 of the closure member slightly overlaps the inner edge 19 of the trim ring 16 so as to bear against the same and thus aid in holding the trim ring in position.

In Figure 2, I have illustrated the manner in which the continuous flexible edge 22 is slightly buckled or distorted between the protuberances 14, at A, when the edge is in retaining cooperation with the protuberances.

In Figure 3, I have illustrated in dotted lines the manner in which the marginal portion 21 and its edge 22 is flexed in its application over the humps 15 of the undercut protuberances. In this application of the cover member to the wheel, the edge 22 is caused to slide or ride over the outer faces 18 of the protuberances 14 until the edge bottoms against the under edge 19 of the trim ring 16.

By the arrangement above described a much cheaper closure member from the standpoint of the amount of metal involved therein is produced without in any way detracting from its desirable flexible and rigidifying characteristics. That is to say, it is not necessary to provide any rigidifying flange radially outward from the turned edge of the closure member, since I am enabled to accomplish the necessary rigidifying effect by incorporating in the body of the closure member a reinforcing or stiffening rib 23. Needless to say, any number of these ribs may be used depending upon the amount of flexibility desired. I have obtained excellent results by using one rib as shown in the drawing.

Moreover, this rib 23 also serves another useful purpose in that it provides a shoulder under which an end of a pry-off tool 25 may be inserted to pry the closure member loose from the wheel. In this operation, as shown in Figure 3, the pry-off tool 25 has its blunt end inserted under the shoulder of the rib 23 and is then pressed against an edge of the tire rim 10, so that a pry-off force may be applied directly to the stiffening rib 23 of the closure member. When thus pried loose, the cover member is, after the application of a given amount of pressure, forcibly ejected or sprung loose from the protuberances. In use, I have found that my cover member is easy to apply but considerably more difficult to remove. It has what I term "easy-on and hard-off" characteristics.

It will also be perceived that by making the closure member 17 of springy material such, for example, as stainless steel, I am enabled to provide the crown or face portion 24 with sufficient resiliency that it will serve to resist yieldably permanent indentation. That is to say, if any pebbles or the like strike this face portion 24 of the closure member, the blows imparted to the face portion will be resiliently resisted by the natural springiness of the face portion 24. As a consequence, any slight indentation in the face portion 24 will be sufficiently repelled so that the face portion will readily flex back to its original shape or may be easily snapped back to that shape upon a slight manual pressure on the inside surface of the face portion.

It will, of course, be understood that various details of construction may be varied through a wide range without departing from the principles of this invention, and it is, therefore, not the purpose to limit the patent granted hereon otherwise than necessitated by the scope of the appended claims.

I claim as my invention:

1. In combination, a wheel including tire rim and body parts, said body part having a plurality of spaced protuberances arranged in a common circle and each having an outwardly facing hump portion, a trim ring for disposition over a side surface of said tire rim part and having a continuous inner edge flexed into retaining engagement with said protuberances by the pressing of the same over said hump portions, and a central cover member having an outer continuous and resilient peripheral edge of such diameter so as to be pressed over the humps of said protuberances and into resilient retaining cooperation therewith and with and over the inner edge of said trim ring so as thus to aid in holding said trim ring in flexed and stressed engagement with said protuberances.

2. In combination, a wheel including tire rim and body parts, said body part having a plurality of spaced protuberances arranged in a common circle and each having an outwardly facing hump portion, a trim ring for disposition over a side surface of said tire rim part and having a continuous inner edge flexed into retaining engagement with said protuberances by the pressing of the same over said hump portions, and a central cover member having on outer continuous and resilient peripheral edge of such diameter as to be pressed over the humps of said protuberances and into resilient retaining cooperation therewith and with and over the inner edge of said trim ring so as thus to aid in holding said trim ring in flexed and stressed engagement with said protuberances, said cover member also having a stiffening rib spaced axially outwardly from said edge so as to provide a flexible skirt portion between said rib and said edge.

3. In combination, a wheel including tire rim and body parts, said body part having a plurality of spaced protuberances arranged in a common circle and each having an outwardly facing hump portion, a trim ring for disposition over a side surface of said tire rim part and having a continuous inner edge flexed into retaining engagement with said protuberances by the pressing of the same over said hump portions, and a central cover member having an outer continuous and resilient peripheral edge of such diameter as to be pressed over the humps of said protuberances and into resilient retaining cooperation therewith and with and over the inner edge of said trim ring so as thus to aid in holding said trim ring in flexed and stressed engagement with said protuberances, said cover member also having a stiffening rib spaced axially outwardly from said edge so as to provide a flexible skirt portion between said rib and said edge, and said stiffening rib comprising a shoulder facing the rim part and disposed in proximity to the junction of said tire rim and body parts so as to serve as a shoulder against which a pry-off tool may be applied to forcibly pry off the cover member from the wheel.

GEORGE ALBERT LYON.